US012811673B2

(12) United States Patent
Sedin et al.

(10) Patent No.: US 12,811,673 B2
(45) Date of Patent: Nov. 24, 2026

(54) MEASUREMENT WINDOW FOR SATELLITE CELL

(71) Applicant: Telefonaktiebolaget LM Ericsson (PUBL), Stockholm (SE)

(72) Inventors: Jonas Sedin, Brentford (GB); Johan Rune, Lidingö (SE); Helka-Liina Määttänen, Espoo (FI); Xingqin Lin, San Josè, CA (US); Emre Yavuz, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 232 days.

(21) Appl. No.: 18/262,679

(22) PCT Filed: Jan. 24, 2022

(86) PCT No.: PCT/IB2022/050597

§ 371 (c)(1),
(2) Date: Jul. 24, 2023

(87) PCT Pub. No.: WO2022/157731

PCT Pub. Date: Jul. 28, 2022

(65) Prior Publication Data

US 2024/0080092 A1 Mar. 7, 2024

Related U.S. Application Data

(60) Provisional application No. 63/141,202, filed on Jan. 25, 2021.

(51) Int. Cl.
*H04B 7/185* (2006.01)
*H04L 5/00* (2006.01)
(Continued)

(52) U.S. Cl.
CPC ....... *H04B 7/18547* (2013.01); *H04B 7/1853* (2013.01); *H04L 5/0051* (2013.01); *H04W 56/0015* (2013.01); *H04W 64/006* (2013.01)

(58) Field of Classification Search
CPC . H04B 7/18547; H04B 7/1853; H04L 5/0051; H04W 56/0015; H04W 64/006
See application file for complete search history.

(56) References Cited

U.S. PATENT DOCUMENTS

2022/0030532 A1* 1/2022 Hajir .................. H04B 7/18513
2023/0284060 A1* 9/2023 Euler .................... H04W 24/10
370/329
(Continued)

FOREIGN PATENT DOCUMENTS

WO 2020148582 A1 7/2020
WO 2020163610 A1 8/2020

OTHER PUBLICATIONS

3GPP TSG RAN meeting #86; Sitges, Spain, Dec. 9-13, 2019; Source: Thales; Title: Solutions for NR to support non-terrestrial networks (NTN); Agenda Item: 9.1.2—Proposals led by RAN2; Release Rel-17 (RP-193234 (revision from RP-192502 3144)).
(Continued)

*Primary Examiner* — Omar J Ghowrwal
(74) *Attorney, Agent, or Firm* — Baker Botts L.L.P.

(57) ABSTRACT

A method (1000) performed by a wireless device (110) includes obtaining (1002) location information associated with the wireless device and/or ephemeris data for one or more satellite cells. The wireless device receives (1004) a measurement configuration to measure reference signals from the one or more satellite cells. The measurement configuration includes at least one measurement window. The wireless device determines (1006) whether to select a measurement window for the one or more satellite cells
(Continued)

based on the location information associated with the wireless device and/or ephemeris data of the one or more satellite cells.

20 Claims, 14 Drawing Sheets

(51) Int. Cl.
*H04W 56/00* (2009.01)
*H04W 64/00* (2009.01)

(56) References Cited

U.S. PATENT DOCUMENTS

2023/0412257 A1* 12/2023 Rasool .................. H04L 5/0078
2024/0063894 A1* 2/2024 Vogedes ............. H04B 7/18504

OTHER PUBLICATIONS

3GPP TSG RAN Meeting #86; Sitges, Spain, Dec. 9-31, 2019; Source: MediaTek Inc.; Title: New Study WID on NB-IoT/eTMC support for NTN (RP-193235).
3GPP TSG-RAN2 Meeting #108; Reno, USA; Nov. 18-22, 2019; Agenda Item: 6.6.4.3; Source: Huawei, HiSilicon; Title: Discussion on SSB measurement in NTN (R2-1915189).
3GPP TR 38.821 v0.9.0 (Oct. 2019) 3rd Generation Partnership Project; Technical Specification Group Radio Access Network; Solutions for NR to support non-terrestrial networks (NTN) (Release 16).
3GPP TSG-RAN WG2 Meeting #112E; Electronic, Nov. 2-13, 2020; Agenda item: 8.10.3.3; Source: ZTE Corporation, Sanechips; Title: Report of [Post111-e] [911] [NTN] Connected mode aspects (ZTE) (R2-2009803).
ETSI TS 138 133 v16.6.0 (Feb. 2021) 5G; NR; Requirements for support of radio resource management (3GPP TS 38.133 version 16.6.0 Release 16).
3GPP TR 38.811 V15.4.0 (Sep. 2020); 3rd Generation Partnership Project; Technical Specification Group Radio Access Network; Study on New Radio (NR) to support non-terrestrial networks (Release 15).
3GPP TR 38.821 V16.0.0 (Dec. 2019); 3rd Generation Partnership Project; Technical Specification Group Radio Access Network; Solutions for NR to support non-terrestrial networks (NTN) (Release 16).
3GPP TS 38.331 V16.3.1 (Jan. 2021); 3rd Generation Partnership Project; Technical Specification Group Radio Access Network; NR; Radio Resource Control (RRC) protocol specification (Release 16).
PCT International Seach Report issued for International application No. PCT/IB2022/050597—Apr. 8, 2022.
PCT Written Opinion of the International Searching Authority issued for International application No. PCT/IB2022/050597—Apr. 8, 2022.
Intellectual Property India Patent Office Official Action in IN Application No. 202317049743 dated Aug. 31, 2026.
Communication pursuant to Article 94(3) EPC in EP Application No. 22 702 037.7-1206, dated Sep. 28, 2026.

* cited by examiner

MEASUREMENT WINDOW FOR SATELLITE CELL

PRIORITY

This nonprovisional application is a U.S. National Stage Filing under 35 U.S.C. § 371 of International Patent Application Serial No. PCT/IB2022/050597 filed Jan. 24, 2022 and entitled "CONDITIONAL SYNCHRONIZATION SIGNAL BLOCK MEASUREMENT TIME CONFIGURATION IN NON-TERRESTRIAL NETWORKS" which claims priority to U.S. Provisional Patent Application No. 63/141,202 filed Jan. 25, 2021, both of which are hereby incorporated by reference in their entirety.

TECHNICAL FIELD

The present disclosure relates, in general, to wireless communications and, more particularly, systems and methods for conditional Synchronization Signal Block Measurement Time Configuration (SMTC) in Non-Terrestrial Networks.

BACKGROUND

Third Generation Partnership Project (3GPP) specifies the Evolved Packet System (EPS). EPS is based on the Long-Term Evolution (LTE) radio network and the Evolved Packet Core (EPC). EPS was originally intended to provide voice and Mobile Broadband (MBB) services but has continuously evolved to broaden its functionality. 3GPP also specifies narrowband Internet of Things (NB-IoT) and LTE for machines (LTE-M) as part of the LTE specifications and provide connectivity to Massive Machine Type Communications (mMTC) services.

3GPP also specifies the 5G system (5GS). This is a new generation radio access technology intended to serve use cases such as Enhanced Mobile Broadband (eMBB), Ultra-Reliable and Low Latency Communication (URLLC) and mMTC. 5G includes the New Radio (NR) access stratum interface and the 5G Core Network (5GC). The NR physical and higher layers reuse parts of the LTE specification, and to that add needed components when motivated by the new use cases. One such component is a sophisticated framework for beam forming and beam management to extend the support of the 3GPP technologies to a frequency range going beyond 6 GHz.

In 3GPP Release 15, 3GPP started the work to prepare NR for operation in a Non-Terrestrial Network (NTN) (e.g., satellite communications). The work was performed within the study item "NR to support Non-Terrestrial Networks" and resulted in 3GPP TR 38.811. In 3GPP Release 16, the work to prepare NR for operation in an NTN network continued with the study item "Solutions for NR to support Non-Terrestrial Network". In parallel, the interest to adapt NB-IoT and LTE-M for operation in NTN is growing. As a consequence, 3GPP Release 17 contains both a work item on NR NTN and a study item on NB-IoT and LTE-M support for NTN.

A satellite radio access network usually includes the following components. A satellite that refers to a space-borne platform. An earth-based gateway that connects the satellite to a base station or a core network, depending on the choice of architecture. A feeder link that refers to the link between a gateway and a satellite. An access link that refers to the link between a satellite and a UE.

Depending on the orbit altitude, a satellite may be categorized as low earth orbit (LEO), medium earth orbit (MEO), or geostationary earth orbit (GEO) satellite. LEO includes typical heights ranging from 250-1,500 km, with orbital periods ranging from 90-120 minutes. MEO includes typical heights ranging from 5,000-25,000 km, with orbital periods ranging from 3-15 hours. GEO includes height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

Two basic architectures have been considered. One is the transparent payload (also referred to as bent pipe architecture). In this architecture, the gNodeB (gNB) is located on the ground and the satellite forwards signals/data between the gNB and the UE. Another is the regenerative payload. In this architecture, the gNB is located in the satellite. In the work item for NR NTN in 3GPP Release 17, only the transparent architecture is considered.

FIG. 1 illustrates an example architecture of a satellite network with bent pipe transponders. The gNB may be integrated in the gateway or connected to the gateway via a terrestrial connection (wire, optic fiber, wireless link).

Propagation delay is an important aspect of satellite communications that is different from the delay expected in a terrestrial mobile system. For a bent pipe satellite network, the round-trip delay may, due to the orbit height, range from tens of ms in the case of LEO to several hundreds of ms for GEO. This can be compared to the round-trip delays catered for in a cellular network which are limited to 1 ms.

The distance between the user equipment (UE) and a satellite can vary significantly, depending on the position of the satellite and thus the elevation angle F seen by the UE. Assuming circular orbits, the minimum distance is realized when the satellite is directly above the UE (ε=90°), and the maximum distance when the satellite is at the smallest possible elevation angle. Table 1 shows the distances between satellite and UE for different orbital heights and elevation angles together with the one-way propagation delay and the maximum propagation delay difference (the difference towards ε=90°). Table 1 assumes regenerative architecture. For the transparent case, the propagation delay between gateway and satellite needs to be considered as well, unless the base station corrects for that.

TABLE 1

Propagation delay for different orbital heights and elevation angles.

| Orbital height | Elevation angle | Distance UE <-> satellite | One-way propagation delay | Propagation delay difference |
|---|---|---|---|---|
| 600 km | 90° | 600 km | 2.0 ms | — |
| | 30° | 1075 km | 3.6 ms | 1.6 ms |
| | 10° | 1932 km | 6.4 ms | 4.4 ms |
| 1200 km | 90° | 1200 km | 4.0 ms | — |
| | 30° | 1999 km | 6.7 ms | 2.7 ms |
| | 10° | 3131 km | 10.4 ms | 6.4 ms |

TABLE 1-continued

Propagation delay for different orbital heights and elevation angles.

| Orbital height | Elevation angle | Distance UE <-> satellite | One-way propagation delay | Propagation delay difference |
|---|---|---|---|---|
| 35786 km | 90° | 35786 km | 119.4 ms | — |
| | 30° | 38609 km | 128.8 ms | 9.4 ms |
| | 10° | 40581 km | 135.4 ms | 16.0 ms |

The propagation delay may also be highly variable due to the high velocity of the LEO and MEO satellites and change in the order of 10-100 μs every second, depending on the orbit altitude and satellite velocity.

In the context of propagation delay, the timing advance (TA) the UE uses for its uplink transmissions is essential and has to be much greater than in terrestrial networks for the uplink and downlink to be time aligned at the gNB, as is the case in NR and LTE. One of the purposes of the random access (RA) procedure is to provide the UE with a valid TA (which the network later can adjust based on the reception timing of uplink transmission from the UE). However, even the random access preamble (i.e., the initial message from the UE in the random access procedure) has to be transmitted with a timing advance to allow a reasonable size of the RA preamble reception window in the gNB, but this TA does not have to be as accurate as the TA the UE subsequently uses for other uplink transmissions. The TA the UE uses for the RA preamble transmission is called "pre-compensation TA". Various proposals are considered for how to determine the pre-compensation TA, all of which involves information originating both at the gNB and at the UE.

One proposal is broadcast of a "common TA" which is valid at a certain reference point, e.g., a center point in the cell. The UE then calculates how its own pre-compensation TA deviates from the common TA, based on the difference between the UE's own location and the reference point together with the position of the satellite. Herein, the UE acquires its own position using Global Navigation Satellite System (GNSS) measurements and the UE obtains the satellite position using satellite orbital data (including satellite position at a certain time) broadcast by the network.

According to another proposal, the UE autonomously calculates the propagation delay between the UE and the satellite based on the UE's and the satellite's respective positions, and the network/gNB broadcasts the propagation delay on the feeder link, i.e., the propagation delay between the gNB and the satellite. The UE may acquire its own position using GNSS measurements, and the UE may obtain the satellite position using satellite orbital data (including satellite position at a certain time) broadcast by the network. The pre-compensation TA is then twice the sum of the propagation delay on the feeder link and the propagation delay between the satellite and the UE.

In another proposal, the gNB broadcasts a timestamp (in SIB9), which the UE compares with a reference timestamp acquired from GNSS. Based on the difference between these two timestamps, the UE can calculate the propagation delay between the gNB and the UE, and the pre-compensation TA is twice as long as this propagation delay.

A second important aspect closely related to the timing is a Doppler frequency offset induced by the motion of the satellite. The access link may be exposed to Doppler shift on the order of 10-100 kHz in sub-6 GHz frequency band and proportionally higher in higher frequency bands. Also, the Doppler shift is varying, with a rate of up to several hundred Hz per second in the S-band and several kHz per second in the Ka-band.

A global navigation satellite system comprises a set of satellites orbiting the earth in orbits crossing each other, such that the orbits are distributed around the globe. The satellites transmit signals and data that facilitates a receiving device on earth to accurately determine time and frequency references and accurately determine its position, provided that signals are received from a sufficient number of satellites (e.g., four). The position accuracy may typically be in the range of a few meters, but using averaging over multiple measurements, a stationary device may achieve much better accuracy.

A well-known example of a GNSS is the American Global Positioning System (GPS). Other examples are the Russian Global Navigation Satellite System (GLONASS), the Chinese BeiDou Navigation Satellite System and the European Galileo.

The transmissions from GNSS satellites include signals that a receiving device uses to determine the distance to the satellite. By receiving such signals from multiple satellites, the device can determine its position. However, this requires that the device also knows the positions of the satellites. To enable this, the GNSS satellites also transmit data about their own orbits (from which position at a certain time can be derived). In GPS, such information is referred to as ephemeris data and almanac data (or sometimes lumped together under the term navigation information).

The time required to perform a GNSS measurement, e.g. GPS measurement, may vary widely, depending on the circumstances, mainly depending on the status of the ephemeris and almanac data the measuring devices has previously acquired (if any). In the worst case, a GPS measurement can take several minutes. GPS is using a bit rate of 50 bps for transmitting its navigation information. The transmission of the GPS date, time and ephemeris information takes 90 seconds. Acquiring the GPS Almanac containing orbital information for all satellites in the GPS constellation takes more than 10 minutes. If a UE already possesses this information, the synchronization to the GPS signal for acquiring the UE position and Coordinated Universal Time (UTC) is a significantly faster procedure.

3GPP NTN is dependent on GNSS. To handle the timing and frequency synchronization in a NR- or LTE-based NTN, a promising technique is to equip each device with a GNSS receiver. The GNSS receiver facilitates a device to estimate its geographical position. In one example, a NTN gNB carried by a satellite broadcasts its ephemeris data (i.e., data that informs the UE about the satellite's position, velocity and orbit) to a GNSS equipped UE. The UE can then determine the propagation delay, the delay variation rate, the Doppler shift and its variation rate based on its own location (obtained through GNSS measurements) and the satellite location and movement (derived from the ephemeris data).

The GNSS receiver also facilitates a device to determine a time reference (e.g., in terms of UTC) and frequency reference. This can also be used to handle the timing and frequency synchronization in a NR or LTE based NTN. In a second example, a NTN gNB carried by a satellite broadcasts its timing (e.g., in terms of a Coordinated Universal Time (UTC) timestamp) to a GNSS equipped UE. The UE can then determine the propagation delay, the delay variation rate, the Doppler shift, and its variation rate based on its time/frequency reference (obtained through GNSS measurements) and the satellite timing and transmit frequency.

The UE may use this knowledge to compensate its uplink transmissions for the propagation delay and Doppler effect.

With respect to NB-IoT and LTE-M for NTN, 3GPP specifications note that GNSS capability in the UE is taken as a working assumption for both NB-IoT and eMTC devices. With this assumption, a UE can estimate and pre-compensate timing and frequency offset with sufficient accuracy for uplink transmission. Simultaneous GNSS and NTN NB-IoT/eMTC operation is not assumed.

Furthermore, in the NTN work item and IoT NTN study item for 3GPP Release 17, GNSS capability is assumed. For example, it is assumed that a NTN capable UE also is GNSS capable and GNSS measurements at the UEs are essential for the operation of the NTN.

NR also includes SSB-MTC and measurement gaps. NR synchronization signal (SS) consists of primary SS (PSS) and secondary SS (SSS). NR physical broadcast channel (PBCH) carries the very basic system information. The combination of SS and PBCH is referred to as SSB in NR. Multiple SSBs are transmitted in a localized burst set. Within a SS burst set, multiple SSBs can be transmitted in different beams. The transmission of SSBs within a localized burst set is confined to a 5 ms window. The set of possible SSB time locations within an SS burst set depends on the numerology which in most cases is uniquely identified by the frequency band. The SSB periodicity can be configured from the value set {5, 10, 20, 40, 80, 160} ms.

A UE does not need to perform measurements with the same periodicity as the SSB periodicity. Accordingly, the SSB measurement time configuration (SMTC) has been introduced for NR. The signaling of SMTC window informs the UE of the timing and periodicity of SSBs that the UE can use for measurements. The SMTC window periodicity can be configured from the value set {5, 10, 20, 40, 80, 160} ms, matching the possible SSB periodicities. The SMTC window duration can be configured from the value set {1, 2, 3, 4, 5} ms.

The UE may use the same radio frequency (RF) module for measurements of neighboring cells and data transmission in the serving cell. Measurement gaps enable the UE to suspend the data transmission in the serving cell and perform the measurements of neighboring cells. The measurement gap repetition periodicity can be configured from the value set {20, 40, 80, 160} ms, the gap length can be configured from the value set {1.5, 3, 3.5, 4, 5.5, 6} ms. Usually, the measurement gap length is configured to be larger than the SMTC window duration to account for RF retuning time. Measurement gap time advance is also introduced to fine tune the relative position of the measurement gap with respect to the SMTC window. The measurement gap timing advance can be configured from the value set {0, 0.25, 0.5} ms.

FIG. 2 illustrates an example of SSB, SMTC window, and measurement gap. Section 5.5.2.10 in 3GPP TS 38.331 specifies SMTC configuration as follows:

The UE shall setup the first SS/PBCH block measurement timing configuration (SMTC) in accordance with the received periodicityAndOffset parameter (providing Periodicity and Offset value for the following condition) in the smtc1 configuration. The first subframe of each SMTC occasion occurs at an SFN and subframe of the NR SpCell meeting the following condition:

```
SFN mod T = (FLOOR (Offset/10));
if the Periodicity is larger than sf5:
  subframe = Offset mod 10;
```

-continued

```
else:
  subframe = Offset or (Offset +5);
with T = CEIL(Periodicity/10).
```

If smtc2 is present, for cells indicated in the pci-List parameter in smtc2 in the same MeasObjectNR, the UE shall setup an additional SS/PBCH block measurement timing configuration (SMTC) in accordance with the received periodicity parameter in the smtc2 configuration and use the Offset (derived from parameter periodicityAndOffset) and duration parameter from the smtc1 configuration. The first subframe of each SMTC occasion occurs at an SFN and subframe of the NR SpCell meeting the above condition.

If smtc2-LP is present, for cells indicated in the pci-List parameter in smtc2-LP in the same frequency (for intra frequency cell reselection) or different frequency (for inter frequency cell reselection), the UE shall setup an additional SS/PBCH block measurement timing configuration (SMTC) in accordance with the received periodicity parameter in the smtc2-LP configuration and use the Offset (derived from parameter periodicityAndOffset) and duration parameter from the smtc configuration for that frequency. The first subframe of each SMTC occasion occurs at an SFN and subframe of the NR SpCell or serving cell (for cell reselection) meeting the above condition.

On the indicated ssbFrequency, the UE shall not consider SS/PBCH block transmission in subframes outside the SMTC occasion for RRM measurements based on SS/PBCH blocks and for RRM measurements based on CSI-RS except for SFTD measurement (see 3GPP TS 38.133, subclause 9.3.8).

There currently exist certain challenges. For example, SMTC and the different variants thereof are efficient means to facilitate for a UE to find relevant SSB transmissions and to limit the SSB search and measurement effort in terrestrial networks. However, the special properties of NTNs impose problems that are not present in terrestrial networks and which the existing SMTC definition is not adapted to deal with.

For example, consider the scenario where the network that serves the UE is a LEO satellite network with a significant amount of transparent satellites at 600 km altitude, in the range of thousands of satellites that orbit the earth, providing connectivity the UEs on earth. The UE is located at (long, lat)=(x1,y1) and the ground gateway, i.e., the gNB that receives the signal is located at (long, lat)=(x2,y2), which is a typical scenario. For example, FIG. 3 illustrates an example of the round-trip propagation delay from the UE to the satellite/gNB (which is the propagation delay from UE to satellite to ground gateway) as function of time for a stationary UE. Each line represents the propagation delay to a gNB on the ground through a satellite.

FIG. 3 reveals that there will be a lot of satellites at varying propagation delays compared to the satellite with the smallest propagation delay. Because the propagation delay is related to the distance from the UE to the satellite, the satellite with the lowest propagation delay is also typically the satellite that the UE will have the strongest signal to, although that might not always be the case.

Even though there are a large number of satellites, the number of interesting satellites to which the UE may connect is not necessarily that large. Furthermore, with the network being aware of both the satellite orbit as well as the UE position, it is possible for the network to know which satellite or satellites whose cells that the UE should choose from.

As seen from FIG. 3, the network may configure the UE to measure and track a set of satellites, which corresponds to a set of cells, which further corresponds to a set of physical cell identities (PCIs) (included in SSBs), the UE would likely have to track the SSBs and, due to the satellites' movements with resulting changing propagation delays, measure far outside of the measurement windows that are defined through SMTC and measurement gaps.

SUMMARY

Certain aspects of the present disclosure and their embodiments may provide solutions to these or other challenges. Particular embodiments include UE embodiments.

According to certain embodiments, a method by a wireless device includes obtaining location information associated with the wireless device and/or ephemeris data for one or more satellite cells. The wireless device receives a measurement configuration to measure reference signals from the one or more satellite cells, and the measurement configuration comprising at least one measurement window. The wireless device determines whether to select a measurement window for the one or more satellite cells based on the location information associated with the wireless device and/or ephemeris data of the one or more satellite cells.

According to certain embodiments, a wireless device is adapted to obtain location information associated with the wireless device and/or ephemeris data for one or more satellite cells. The wireless device is further adapted to receive a measurement configuration to measure reference signals from the one or more satellite cell. The measurement configuration comprising at least one measurement window. The wireless device is adapted to determine whether to select a measurement window for the one or more satellite cells based on the location of the wireless device and/or the ephemeris data for the one or more satellite cells.

Certain embodiments may provide one or more of the following technical advantages. For example, particular embodiments reduce the need for extended SMTC windows, thereby facilitating greater scheduling flexibility in the serving cell, and can further reduce the amount of required measurements due to the SMTC window(s) not always containing any SSB transmission(s) to measure on, thus reducing UE power consumption.

Other advantages may be readily apparent to one having skill in the art. Certain embodiments may have none, some, or all of the recited advantages.

BRIEF DESCRIPTION OF DRAWINGS

For a more complete understanding of the disclosed embodiments and their features and advantages, reference is now made to the following description, taken in conjunction with the accompanying drawings, in which.

DETAILED DESCRIPTION

Figure 1:
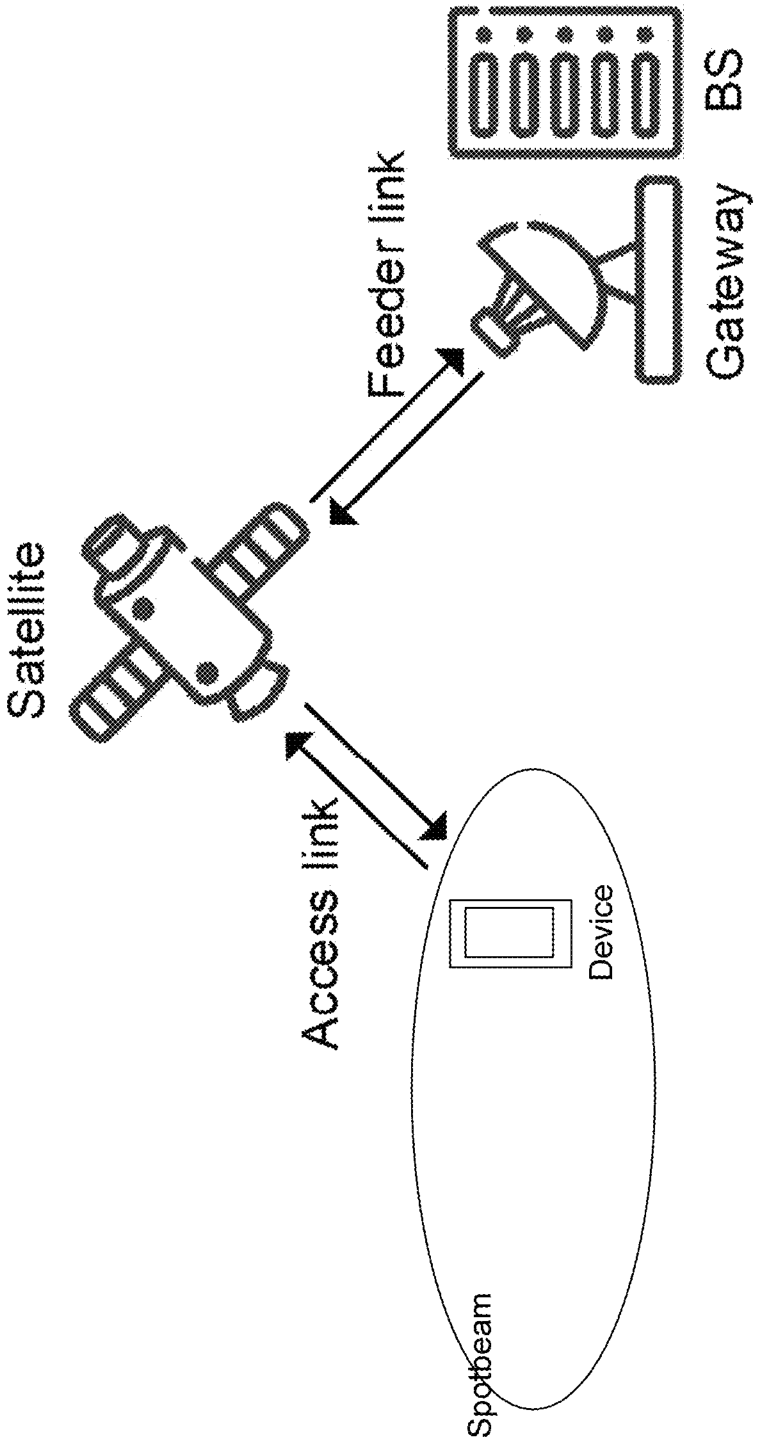
FIG. 1 illustrates an example architecture of a satellite network with bent pipe transponders.
Figure 2:
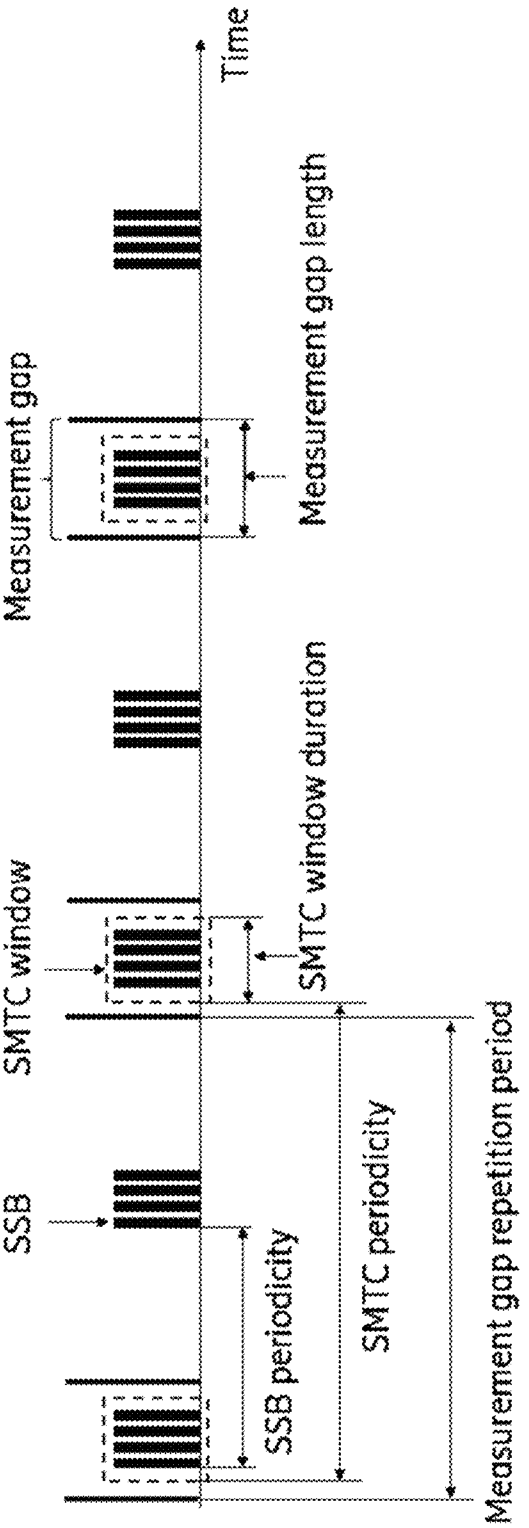
FIG. 2 illustrates an example of SSB, SMTC window, and measurement gap.
Figure 3:
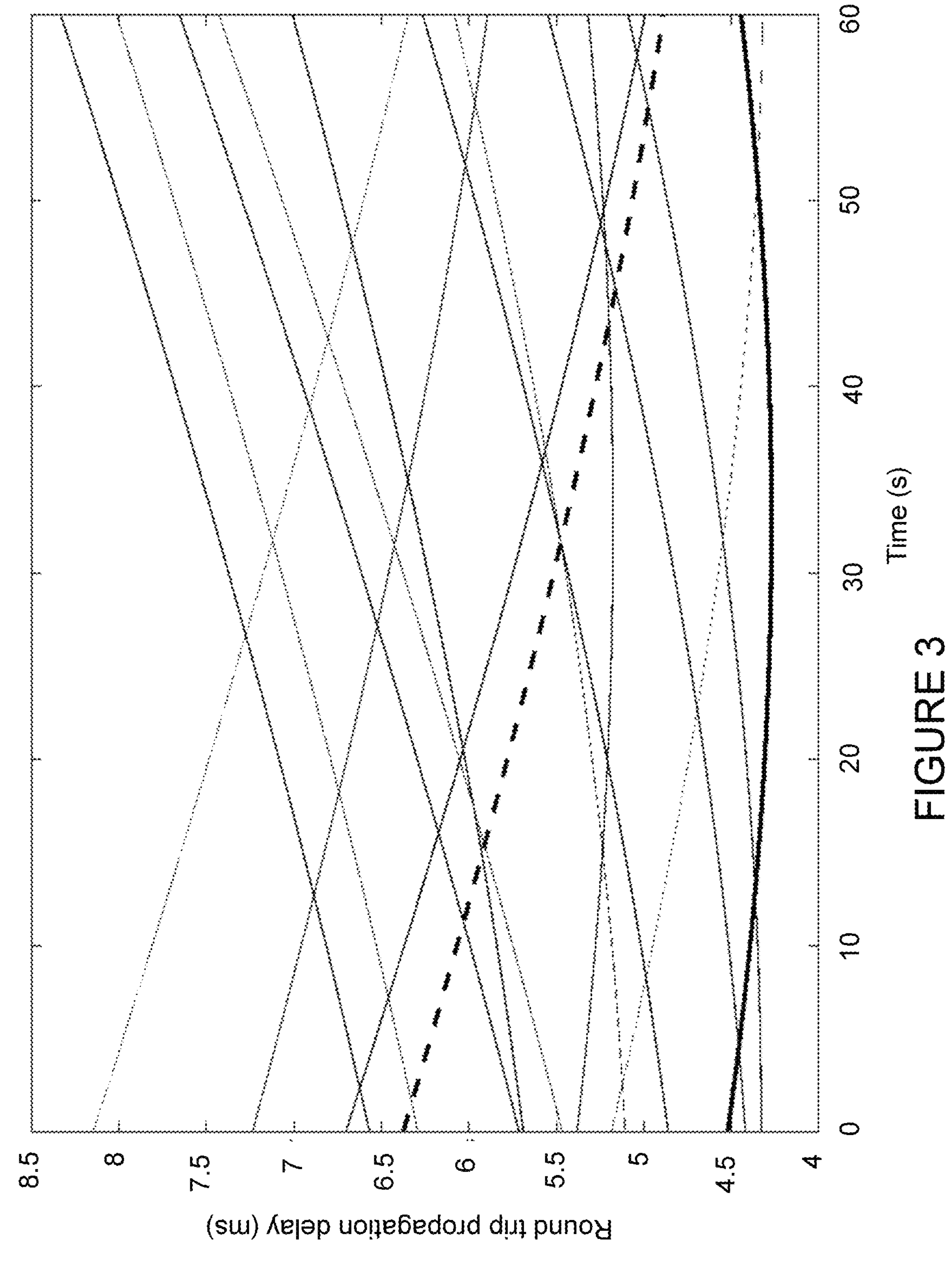
FIG. 3 illustrates an example of the round-trip propagation delay as function of time for a stationary UE.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Although particular problems and solutions may be described using new radio (NR) terminology, it should be understood that the same solutions apply to long term evolutions (LTE) and other wireless networks as well, where applicable.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The embodiments outlined below are described mainly in terms of NR based Non-Terrestrial Networks (NTNs), but they are equally applicable in a NTN based on LTE technology or any other radio access technology (RAT) where measurement windows and gaps may be configured.

Particular examples focus on Synchronization Signal Block Measurement Time Configuration (SMTC) and SMTC window configuration and corresponding measurement gaps, but embodiments are equally applicable if the SMTC configuration is replaced by Received Signal Strength Indicator Measurement Timing Configuration (RMTC) or measurement timing configuration for any other reference signal or other type of measurable signal (e.g., a signal suitable for channel quality measurement).

In the following, the following actions might be used interchangeably: 1) measuring a satellite, 2) measuring SSB(s), and/or 3) measuring neighboring cells(s). In general, it can be said that a single satellite might have multiple cells, a cell has a PCI, and a cell may transmit multiple SSBs. It is assumed that there are PCI-to-satellite mapping either provided explicitly or implicitly by ephemeris data or similar. A further set of actions might also be used interchangeably: 1) measuring an SSB, 2) detecting SSB, or and/3) attempting to detect an SSB.

As described above, the number of satellites for which SMTC windows may be configured may pose a problem such as, for example, in terms of complicating and reducing the flexibility of the scheduling in the UE's serving cell and because it may cause excessive measurement efforts with associated energy consumption in the UE. Therefore, certain embodiments may provide for reduction of the measurable neighbor satellites to the ones that are reasonably close. It may be argued that this is easily achieved if the gNB only configures SMTC windows for neighbor satellites that are close enough, but that would mean that the gNB would have to reconfigure the UE every time one of the neighbor satellites passes the propagation delay threshold the gNB uses internally for these decisions. For example, the gNB would have to reconfigure the UE every time a neighbor satellite changes from being too far away to being close enough for measurement or vice versa. To avoid such reconfigurations, the UE may instead be "fully configured" at once, where the configuration includes a propagation delay dependent or distance dependent condition that reduces the number of neighbor satellites the UE actually measures on. In other words, the number of simultaneously "active" SMTC windows may be reduced.

To this end, certain embodiments disclosed herein associate a condition with a configured SMTC window, and the condition may govern when the SMTC window may be used for measurements. In particular embodiments, for example, such a condition may be based on propagation delay or distance to a satellite whose signals should be measured on and which is associated with a SMTC window (e.g., such that a propagation delay below a threshold, or a distance below a threshold, "activates" the SMTC window for measurements).

For example, in some embodiments a UE has satellite ephemeris as well as GNSS location available. The UE receives a measurement configuration with a list of PCIs and SMTC window configurations from gNB. For each SMTC window opportunity and for each PCI in the list of configured PCIs, the UE checks the associated satellite for the PCI and the UE uses ephemeris information of the satellite associated with the PCI (and possibly its own location to be more accurate) to determine whether the SSB of the corresponding cell would fall within this SMTC window. If yes, the UE attempts to detect and measure the SSB within the SMTC window. Otherwise, the UE does not attempt to detect the SSB associated with this PCI in this SMTC window. If none of the PCIs in the list is included in a SSB transmission that arrives within the SMTC window, the SMTC-window instance is skipped. The UE uses the measurement results for computation of neighboring cell signal strength.

According to certain embodiments, the network aims to configure the SMTC window(s) such that neighbor satellites' SSB transmissions arrive within the SMTC window(s) when the neighbor satellites are relatively close to the UE or UE is relatively close to the cell border.

For example, particular embodiments associate a condition with a configured SMTC window, where the condition governs when the SMTC window may be used for measurements. Such a condition may be based on propagation delay or distance to a satellite whose signals should be measured on and which is associated with a SMTC window (e.g., such that a propagation delay below a threshold, or a distance below a threshold, "activates" the SMTC window for measurements). The condition may be extended with a condition based on the satellite's movement direction, such that a satellite that is moving away from the UE does not activate the SMTC window, regardless of the distance or propagation delay.

In some embodiments, the UE tracks the expected propagation delays of SSBs from neighboring satellites and measures them when they are inside the SMTC window. For example, a method for a UE to measure neighboring cells comprises: the UE receiving its location and ephemeris data of satellite cells; the UE receiving a measurement configuration to measure other satellite cells from the network; the UE determining whether to detect a SMTC window; and the UE measuring/detecting neighboring cell.

In some embodiments, the UE measures the SSBs of satellite cells. The UE received configuration may be a set of PCIs and SMTC window. The UE may determine whether to measure a specific cell based on ephemeris data and UE location. If the SSB is within the SMTC window, the UE may determine to measure/detect, else determines to not measure.

Some embodiments may include a condition related to the movement direction of a neighbor satellite. This could be integrated in the SMTC window activation condition. For example, a combined condition could be that a SMTC window is activated for measurement on signals from satellite X, if the distance/propagation delay to satellite X is below a threshold and the movement direction of satellite X is not away from the UE (where "away" from the UE could simply be defined as the time derivative of the distance or propagation delay between the UE and the satellite is greater than zero).

The movement direction may also be considered in combination with the distance/propagation delay, such that, for example, as long as the distance/propagation delay is below a certain (preferably configurable) threshold, the satellite's movement direction may be ignored, while if the distance/propagation delay is above the threshold, the satellite is ignored if it is moving away from the UE, even if the distance/propagation delay is still small enough to motivate measurement if the satellite was not moving away from the UE (e.g., the "regular", movement direction independent distance/propagation delay condition). A corresponding reasoning may also be applied to a satellite moving towards a UE. That is, if a satellite is moving towards the UE, the UE may start to measure on it even before the distance/propagation delay to the satellite is not yet small enough to motivate measurement if the satellite was not moving towards the UE (e.g., the "regular", movement direction independent distance/propagation delay condition). When satellite's movement direction is taken into account in these ways, the speed with which it is approaching the UE or moving away from the UE may also be taken into account where this speed may be impacted, e.g., by the satellite's movement speed along its orbit and the horizontal distance between the UE and the satellite's orbit's projection on the ground.

Some embodiments may include other more complex combinations such as, for example, involving movement direction angles, satellite speed, margin of distance/propagation delay below the threshold, distance from the UE to the concerned satellite's orbit along a line perpendicular to the satellite's orbit, etc.

The movement direction condition may also be separate from the SMTC window activation condition. For example, the gNB may not configure any SMTC window for a neighbor satellite that is moving away from the UE. That one way to take the movement direction into account, but it fails to handle the situation where a satellite first moves towards the UE and then passes the UE to start moving away from it. To capture such changes, SMTC reconfigurations would be needed, which is to be avoided.

Two groups of example embodiments are described as follows. In a first group of embodiments, as explained above, the difference in propagation delays between satellites means that when attempting to measure SSBs of other cells, the SSBs will end up outside of the window. According to certain embodiments, the window can be extended, but this has the disadvantage that, because measurement gaps must be configured during this time, it means that less time is available for data transmissions. In 3GPP (Rel-15), the network configures the UE with an SMTC configuration as well as a set of PCIs that are used to detect SSBs, whereby the UE will try to detect the SSBs within the SMTC. The general goal is to have as small SMTC windows as possible to allow for more duration where data can be transmitted and for shorter measurement periods.

Certain embodiments enable the UE to disregard SMTC window configuration if there are no SSBs within the window. This is done by the UE having access to ephemeris data that it can map to PCIs. Thus, the UE can use its location to determine whether the SSB of a satellite should be visible within an SMTC and thus be measured.

According to certain embodiments, the UE has satellite ephemeris as well as GNSS location (or some approximate knowledge of location) available. In a particular embodiment, the UE receives a measurement configuration with a list of PCIs and SMTC window configurations from gNB. For each SMTC window opportunity and for each PCI in the list of configured PCIs, the UE checks the associated satellite for the PCI. The UE uses ephemeris information of the satellite associated with the PCI (and possibly its own location to be more accurate) to determine whether the SSB of the corresponding cell would fall within this SMTC window. If yes, the UE attempts to detect and measure the SSB within the SMTC window. Otherwise, the UE does not attempt to detect the SSB associated with this PCI in this SMTC window. If none of the PCIs in the list is included in an SSB transmission that arrives within the SMTC window, deactivate SMTC-window opportunity.

Figure 4:
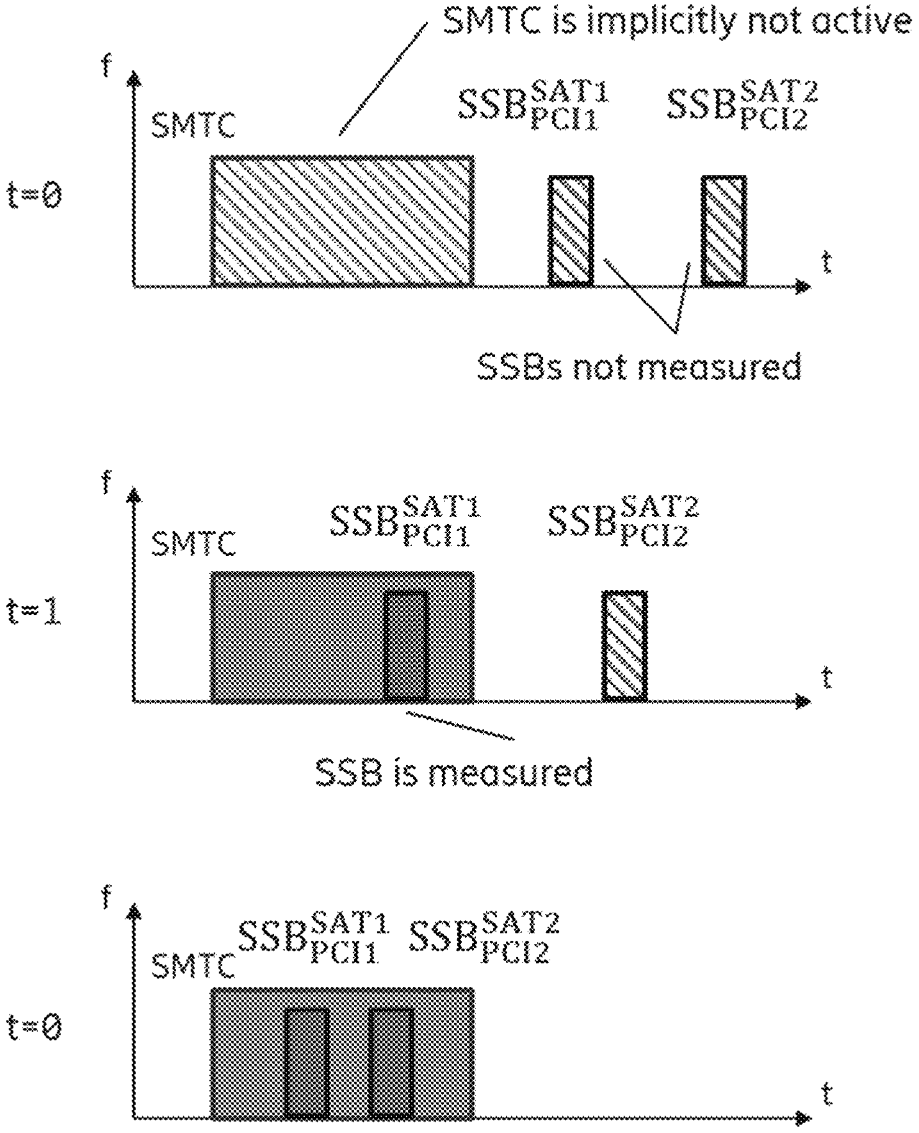
FIG. 4 illustrates an example of measuring SSBs inside and outside SMTC window, according to certain embodiments.

The UE uses the measurement results for computation of neighboring cell signal strength. FIG. 4 illustrates an example of measuring SSBs inside and outside SMTC window, according to certain embodiments.

For receiving the measurement configuration, the measurement configuration can indicate a PCI-to-satellite mapping such as, for example, which satellite is associated with a PCI (and further to SSB), or the mapping may be implicit and configured in advance for other purposes.

Certain embodiments have several advantages. One advantage is that there is no need to extend the SMTC window and consequently the measurement gaps, which facilitates easier scheduling. Another advantage is that there will be cases where the satellites whose SSBs/PCIs to measure are too far away to be useful to measure and thus outside the SMTC window(s), meaning that it is not always required to measure the SSB, allowing for simplification of UE procedures as well as avoiding unnecessary measurements when satellites and their corresponding cells are too far away to have any significant signal strength to be relevant. This requires that the network, e.g. the serving gNB, configures the SMTC window(s) with a goal to ensure that the SSB transmissions with the listed PCIs will arrive within the SMTC window(s) when the transmitting satellite is close enough to be relevant.

In some embodiments, it is known to the network when the UE is able to or should measure and have the corresponding measurement gap active.

In some embodiments, there may be e.g. a rough UE location border expressed e.g. as a distance to serving cell center or as function of the target cell. When the UE crosses this border, it indicates that to the network and thus the network knows the corresponding measurement gap becomes active and the network refrains from scheduling to the UE.

As a further option, the gNB may exclude from the SMTC configuration, any satellite for which the distance from the UE to the concerned satellite's orbit along a line perpendicular to the satellite's orbit is too long (implying that the concerned satellite will never be close enough to the UE to be of interest (unless the UE moves a long distance)).

The UE determines whether to measure a neighboring SSB if the SSB is inside of the SMTC window (i.e., if the SSB transmission arrives to the UE within the SMTC window), by using ephemeris data of the satellite transmitting the SSB and the UE's GNSS location. This presents significant enhancements, but there may still be room for improvements if the ephemeris data and UE GNSS location is available.

When the satellite is moving away from the UE, the SSB of the satellite might still be within the SMTC window due to the propagation delay being within the SMTC window. However, it is unlikely to be a good decision to attempt to connect to a satellite that is currently moving away from the UE. Thus, it is unnecessary to continue to detect and measure the SSB(s) transmitted by a satellite moving away from the UE. Thus, in some embodiments, when a neighbor satellite is moving away from the UE, the UE should not attempt to detect the satellite's SSB transmissions.

The movement direction may also be considered in combination with the distance/propagation delay such that as long as the distance/propagation delay is below a certain (preferably configurable) threshold, for example, the satellite's movement direction may be ignored. Conversely, if the distance/propagation delay is above the threshold, the satellite is ignored if it is moving away from the UE. This is done even if the distance/propagation delay is still small enough to motivate performing measurement.

A corresponding reasoning may also be applied to a satellite moving towards a UE. That is, if a satellite is moving towards the UE, the UE may start to measure on it even before the distance/propagation delay to the satellite is not yet small enough to motivate measurement if the satellite was not moving towards the UE (e.g., the "regular" movement direction independent distance/propagation delay condition).

When the satellite's movement direction is taken into account in these ways, the speed with which it is approaching the UE or moving away from the UE may also be taken into account. This speed may be impacted, for example, by the satellite's movement speed along its orbit and the horizontal distance between the UE and the satellite's orbit's projection on the ground.

In some embodiments, in addition to distance/propagation delay, another condition can be considered. For example, this condition may be based on the time that UE is expected to be serviced by a particular satellite, e.g., T_service. This condition may be configured separately or in combination with distance and propagation delay mentioned above with various combinations.

In connected mode such as, for example, a RRC_CONNECTED state, the measurements are often used to report back to the network about the status of neighboring cells. This can be done either autonomously or upon being triggered.

For reporting back the measurement results of SSB measurements, for the sets of SSBs/satellite cells that are in the SMTC window the results are reported back as normal; however, for the SSBs/satellites/cells that are outside, in one particular embodiment an indication is included that they were not measured. Some embodiments include an indication that a certain SSB/PCI was not measured. This can, for example, be done through a flag indicating that it was not measured or through an −inf (minus infinity value) in the measurement value. Another option can be to capture in the associated field description that the absence of a measurement for particular SSBs/satellites/cells would mean implicitly that those were not measured due to being outside of the configured SMTC window. In some embodiments, for those measurements that were made but not reported due to being less than a configured threshold are marked such as, for example, with a flag so that the network is able to differentiate from those SSBs/satellites/cells that were not measured due to being outside of the SMTC window.

The configuration to enable the actions described above can, for example, be signaled as either an indication in the respective measurement object, or within the SMTC configuration, or alternatively per PCI.

Configuring this per measurement object can, for example, allow for SMTC windows associated with a specific measurement object to use the methods described above, while other measurement objects use legacy methods. This can, for example, allow use cases where on certain carriers, more relaxed measurement procedures are used to simplify UE procedures and reduce power consumption. Another use case may be that the legacy methods are used for measurements on cells/carriers in terrestrial networks, while the embodiments described herein are used for measurements on cells/carriers in non-terrestrial networks. This use case is applicable both when the UE is connected in a cell in a terrestrial network and when it is connected in a cell in a non-terrestrial network.

To enable a UE to not measure when a neighboring satellite/SSB(s) move away from the UE, this can, for example, be configured per PCI. This can enable the network to configure certain satellite(s)/cell(s)/SSB(s) that are less likely to be candidate(s) for being a new serving cell to have more relaxed measurement conditions if it is unlikely that the satellite neighboring cell will be the strongest cell. An alternative to configuring this per PCI is to configure it per satellite. The latter would be a suitable alternative if a satellite identifier is introduced (e.g. standardized) to be used in cases where identification of, or reference to, a certain satellite is needed or beneficial.

As previously mentioned, a benefit of particular embodiments is that the UE's time domain will not be cluttered with SMTC windows for various satellites, which would otherwise complicate and reduce the flexibility of the scheduling of the UE in the serving cell.

In a second group of embodiments, reducing such cluttering may be achieved through additions to other methods for SMTC window configuration in NTNs. Such SMTC window configuration methods may involve that each neighbor satellite may have its own SMTC window and the UE and the gNB can adapt the SMTC windows autonomously to the satellite movements.

In the second group of embodiments, the gNB adds to (or associates with) the SMTC configuration, a maximum propagation delay or a maximum distance (per neighbor satellite or common to all neighbor satellites) at which a neighbor satellite's SMTC window may be used for measurements. As a result, only a subset of the configured SMTC windows will be simultaneously "active", i.e. those for which the associated neighbor satellites are close enough for their respective propagation delay or distance to be smaller than the configured maximum propagation delay or maximum distance. In this, the propagation delay or distance is measured between the concerned satellite and the UE. As an alternative, the propagation delay or distance may be measured between the concerned satellite and a reference location in the UE's serving cell.

As previously described, a satellite's movement direction (and speed with which a satellite is moving towards the UE or away from the UE) may also be taken into account in the condition for activating a SMTC window.

If multiple satellites are associated with the same SMTC window, it is enough that one of these satellites fulfill the SMTC window activation condition for the SMTC window to be activated. In such a scenario, as one option, the UE measures on all the satellites that are associated with an activated SMTC window. As another option, when a SMTC window is activated, the UE measures only on the associated satellites, which fulfill the distance/propagation (and possible movement direction and/or speed) condition.

As a further option, the gNB may exclude from the SMTC configuration, any satellite for which the distance from the UE to the concerned satellite's orbit along a line perpendicular to the satellite's orbit is too long (implying that the concerned satellite will never be close enough to the UE to be of interest (unless the UE moves a long distance)).

Figure 5:
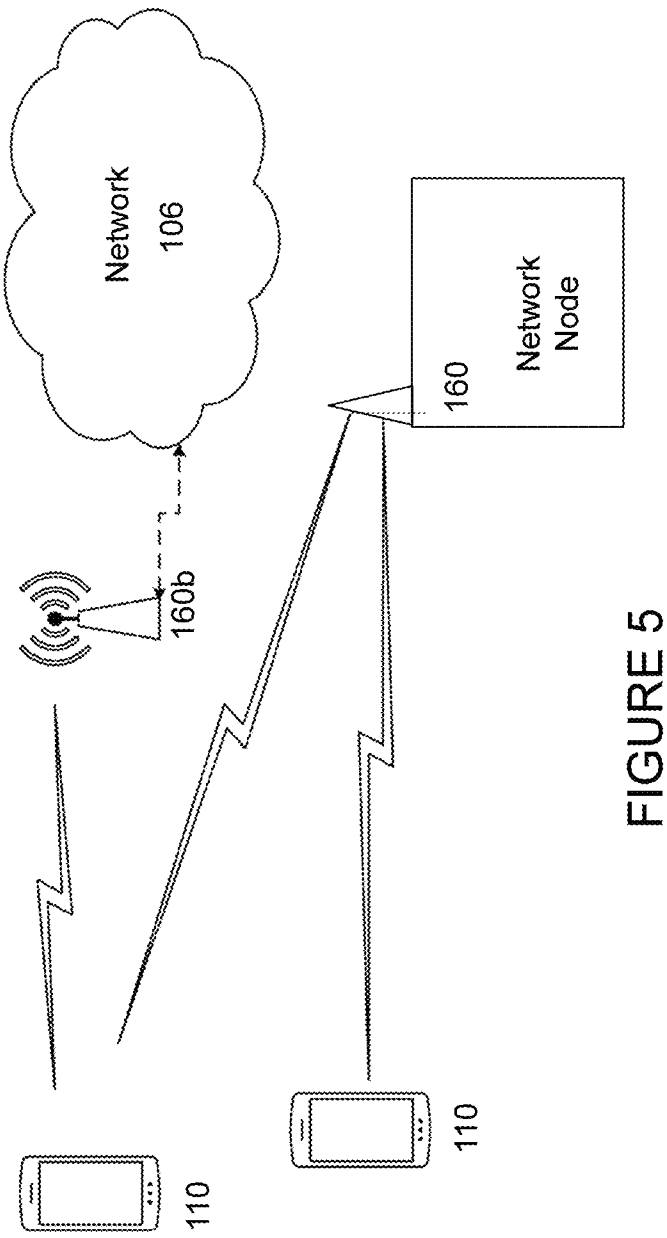
FIG. 5 illustrates an example wireless network, according to certain embodiments.

FIG. 5 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160*b*, and WDs 110. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax™), Bluetooth™, Z-Wave™ and/or ZigBee™ standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
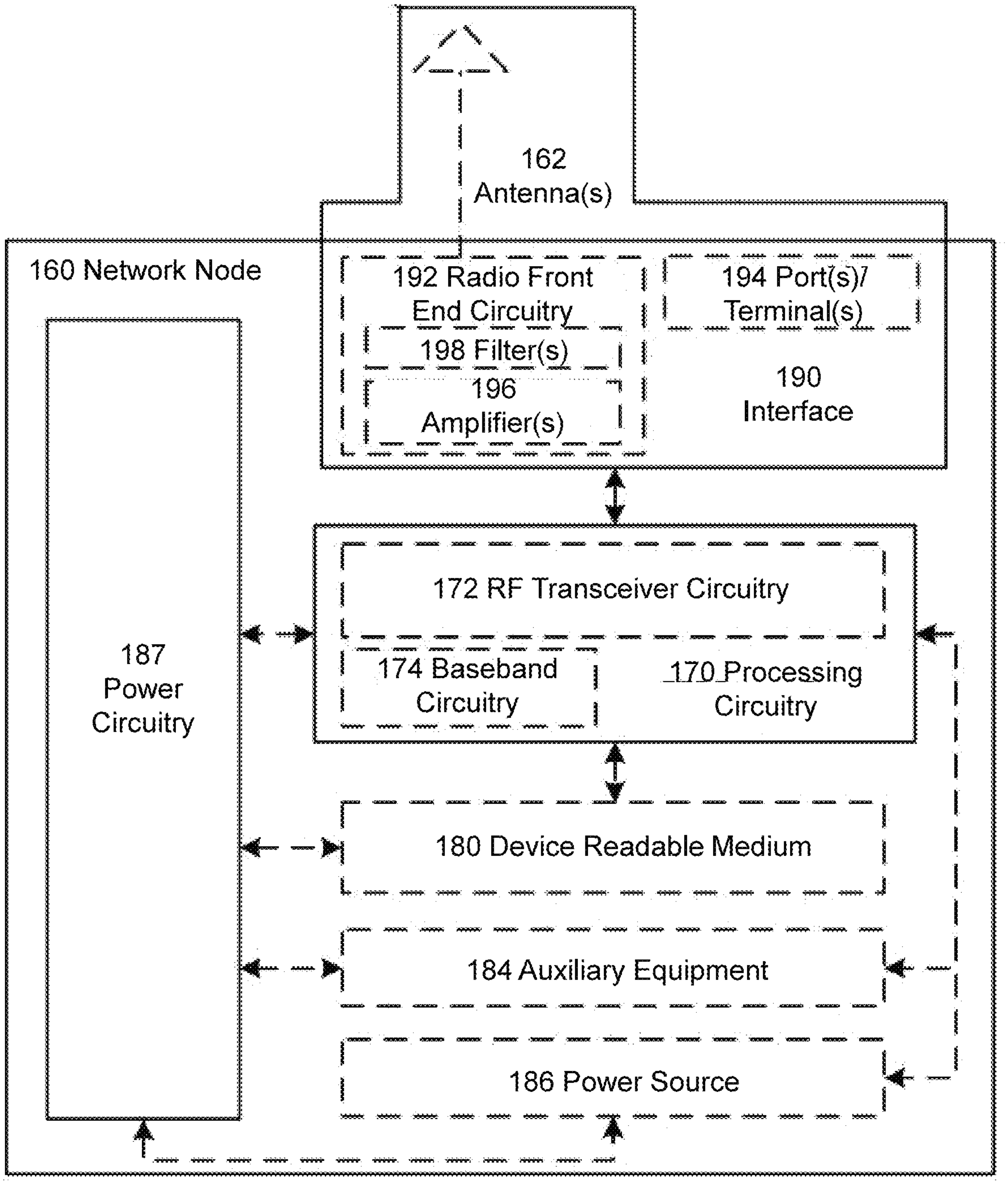
FIG. 6 illustrates an example network node, according to certain embodiments.

FIG. 6 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 7:
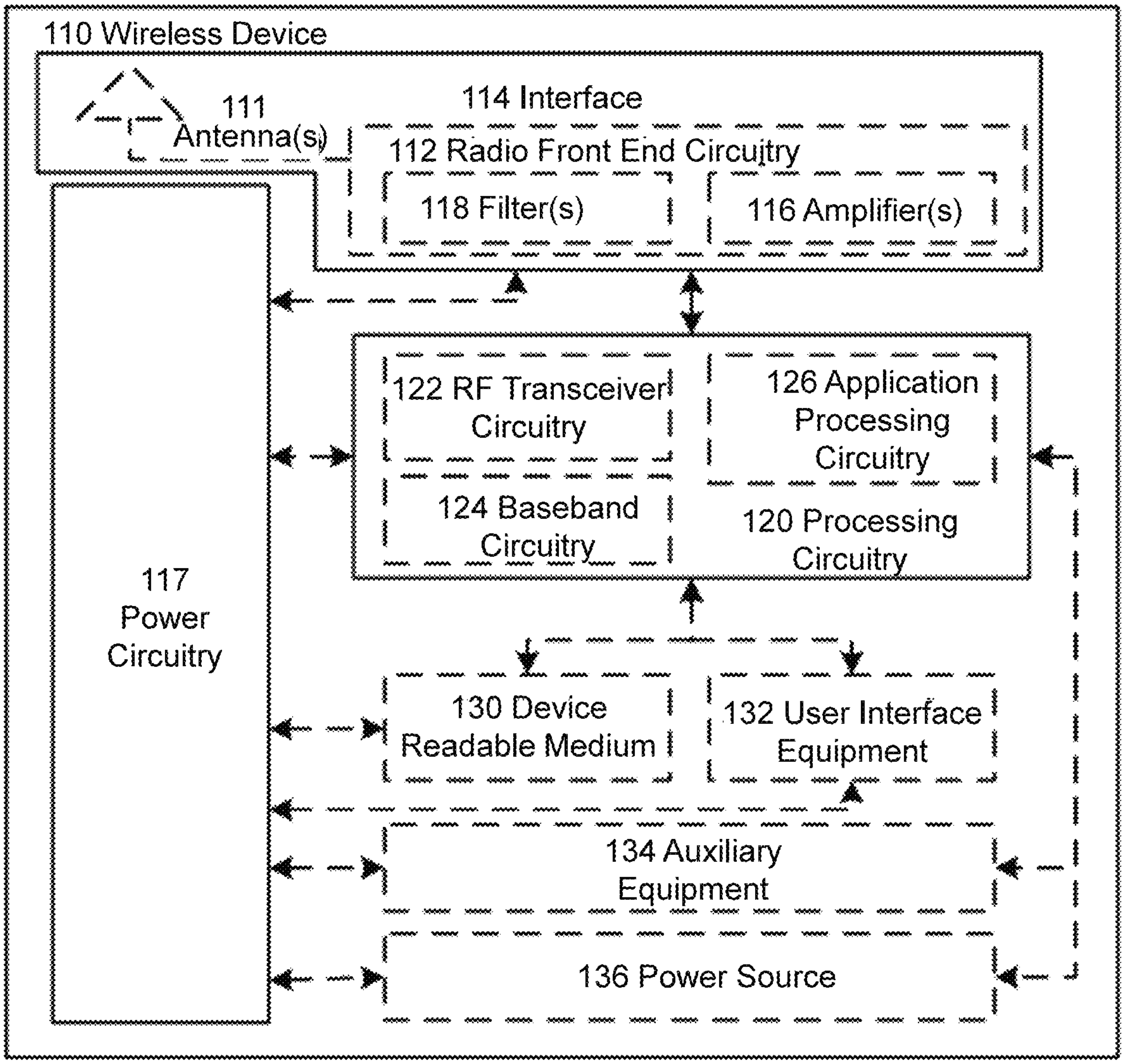
FIG. 7 illustrates an example wireless device, according to certain embodiments.

FIG. 7 illustrates an example wireless device (WD) 110, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 8:
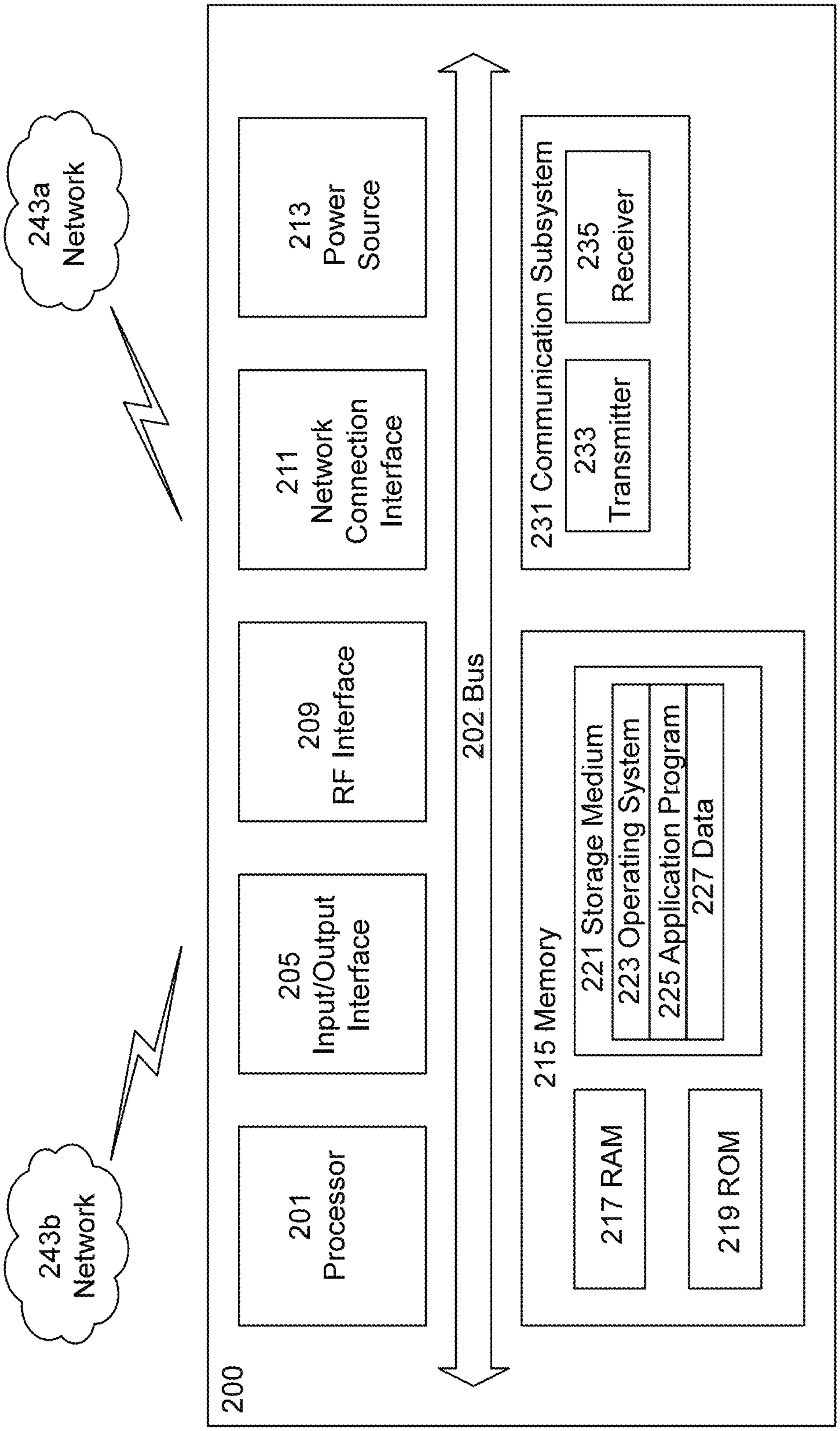
FIG. 8 illustrate an example user equipment, according to certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 8, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network **243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211** may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (T/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
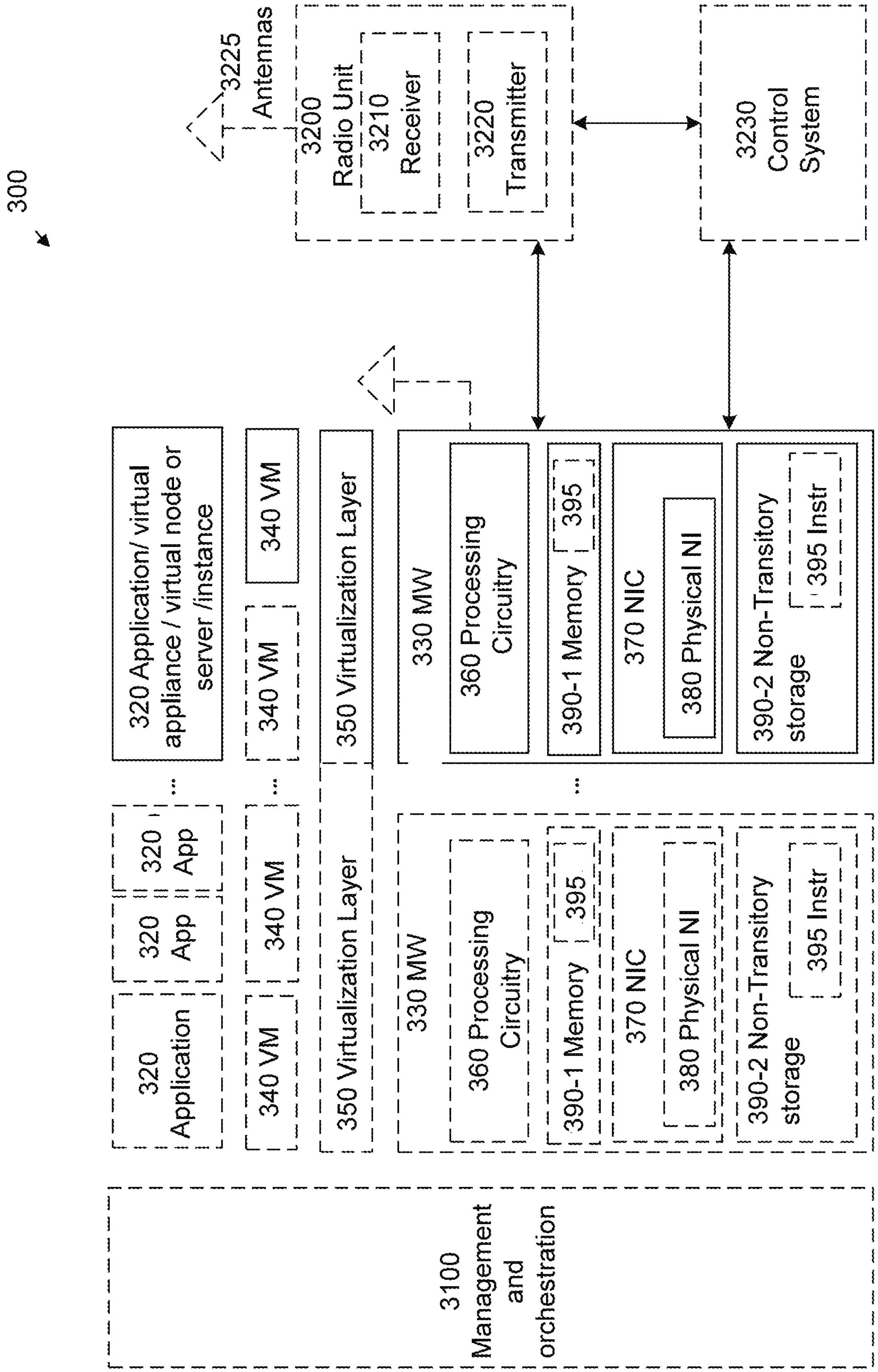
FIG. 9 illustrates a virtualization environment in which functions implemented by some embodiments may be virtualized, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 10:
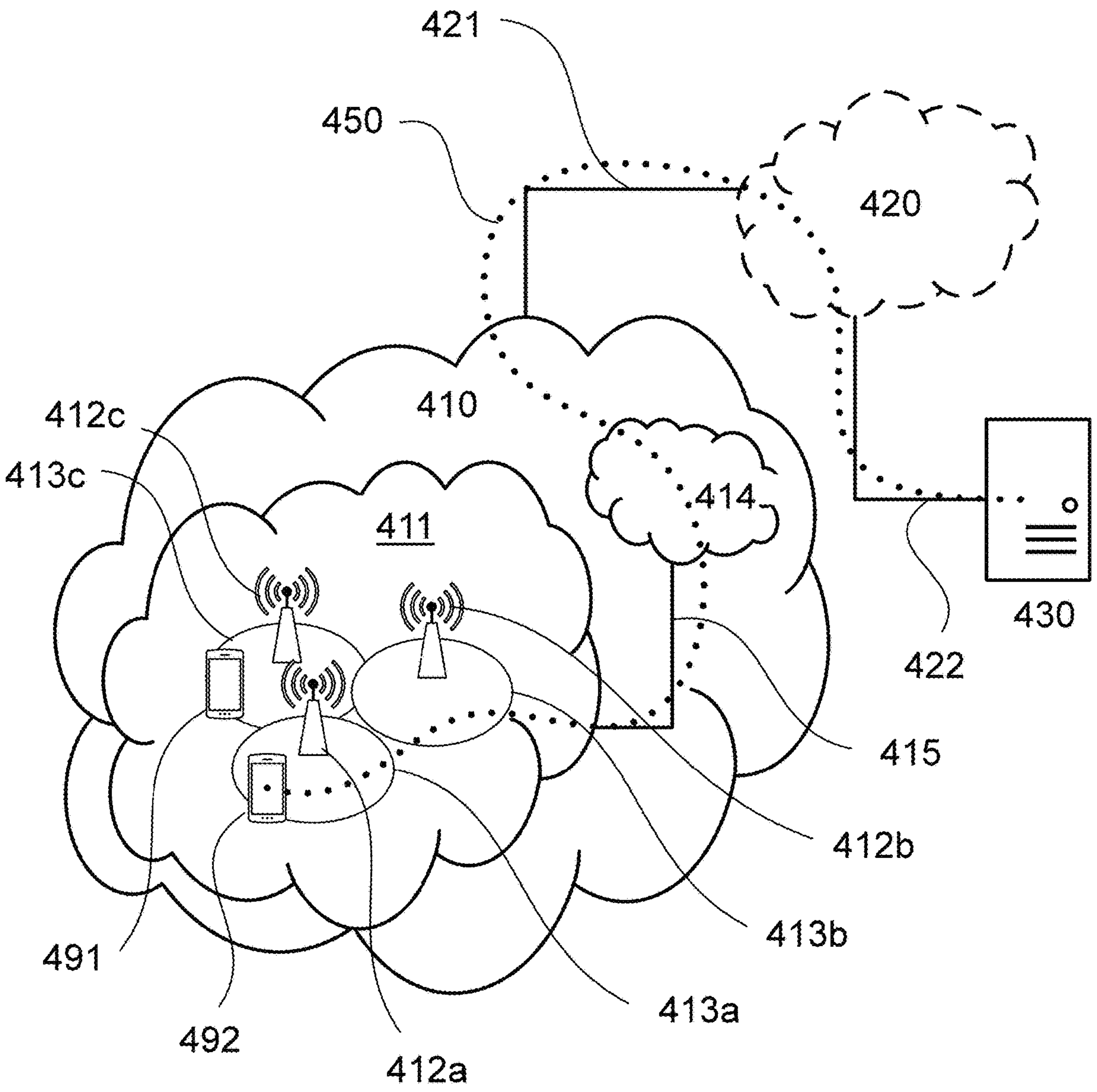
FIG. 10 illustrates a telecommunication network connected via an intermediate network to a host computer, according to certain embodiments.

FIG. 10 illustrates a telecommunication network connected via an intermediate network to a host computer, in accordance with some embodiments.

With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 11:
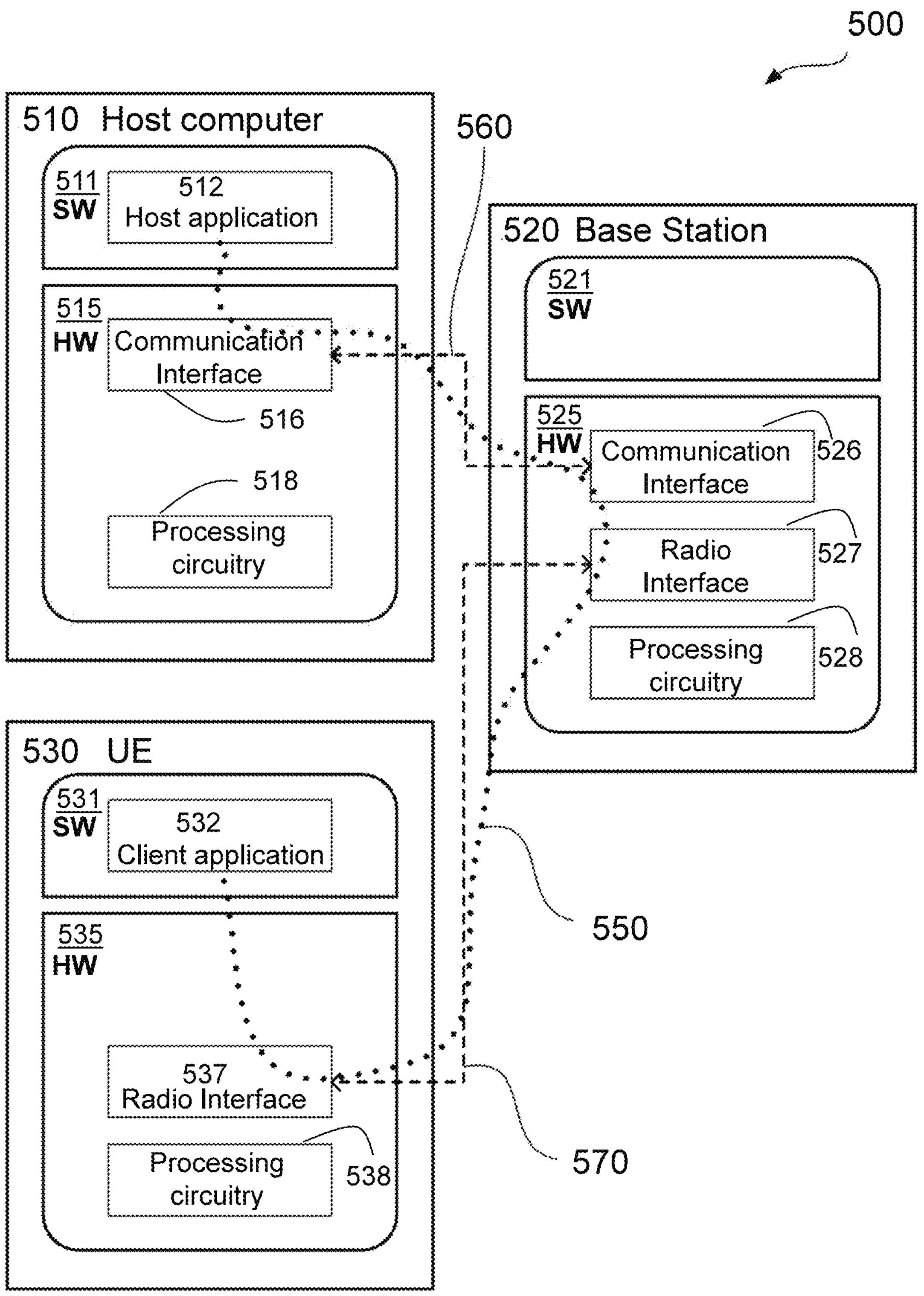
FIG. 11 illustrates a generalized block diagram of a host computer communicating via a base station with a user equipment over a partially wireless connection, according to certain embodiments.

FIG. 11 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 11 may be similar or identical to host computer 430, one of base stations 412*a*, 412*b*, 412*c* and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 12:
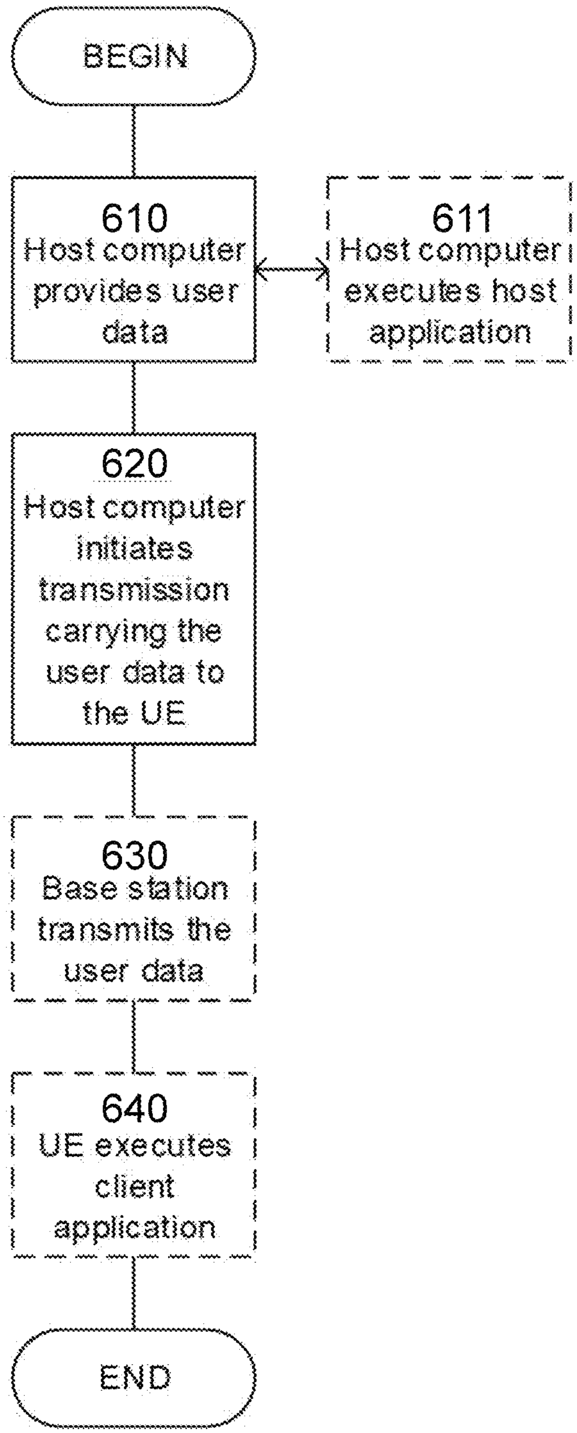
FIG. 12 illustrates a method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 13:
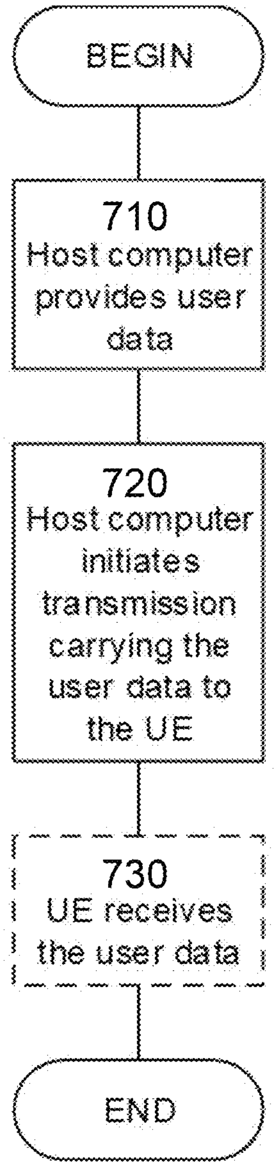
FIG. 13 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 14:
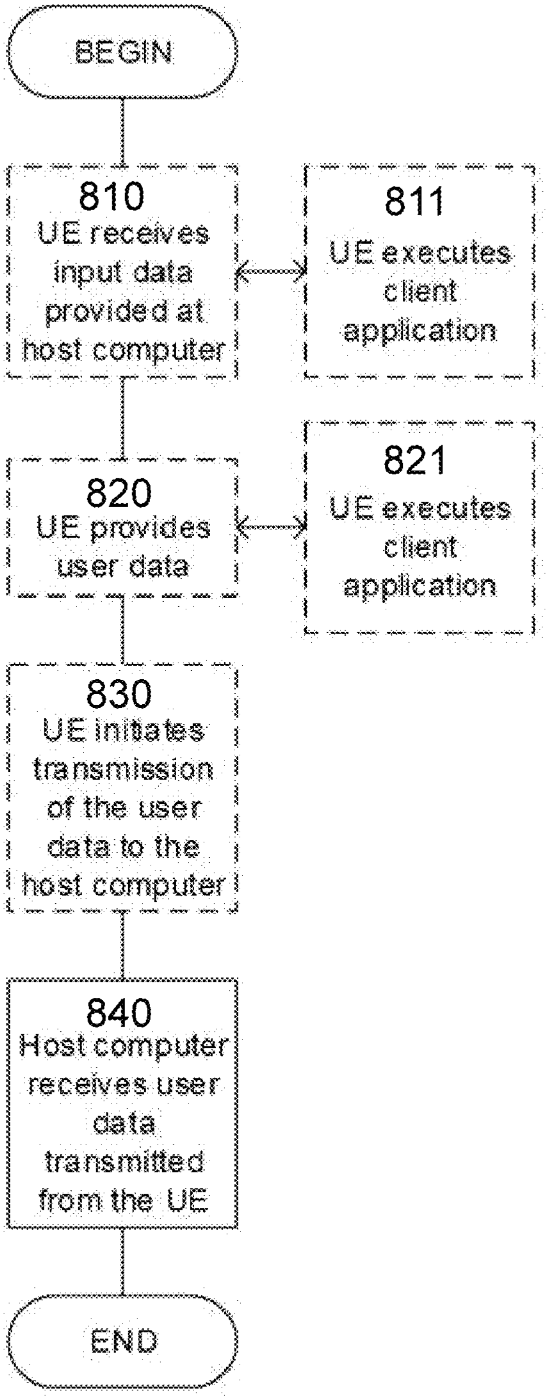
FIG. 14 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 15:
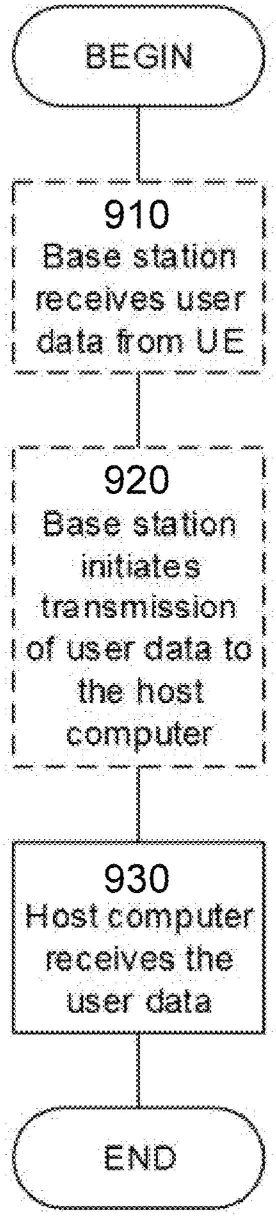
FIG. 15 illustrates another method implemented in a communication system, according to one embodiment.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 16:
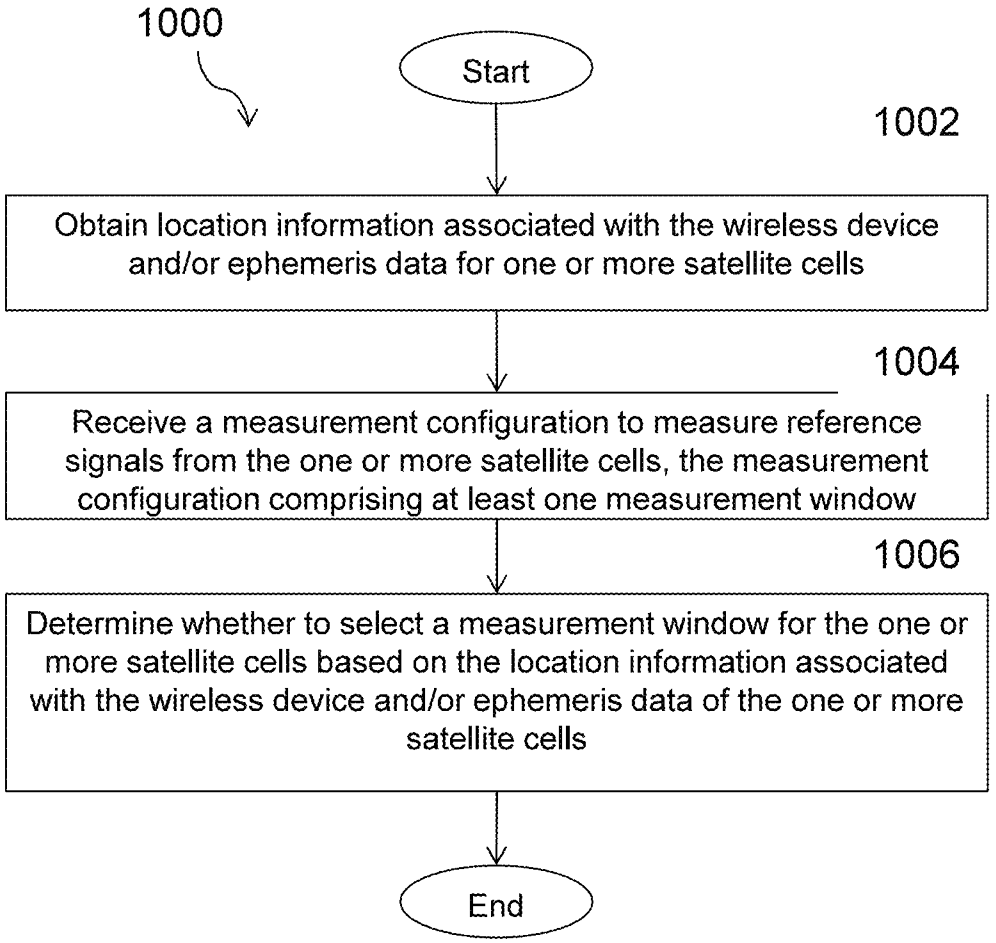
FIG. 16 illustrates an example method by a wireless device, according to certain embodiments.

FIG. 16 illustrates an example method 1000 by a wireless device 110, according to certain embodiments. The method begins at step 1002 when wireless device 110 obtains location information associated with the wireless device and/or ephemeris data for one or more satellite cells. At step 1004, the wireless device 110 receives a measurement configuration to measure reference signals from the one or more satellite cells, the measurement configuration comprising at least one measurement window. At step 1006, the wireless device 110 determines whether to select a measurement window for the one or more satellite cells based on the location information associated with the wireless device and/or ephemeris data of the one or more satellite cells.

In a particular embodiment, the measurement configuration includes a list of PCIs and measurement windows.

In a particular embodiment, determining whether to select the measurement window for the one or more satellite cells includes, for each measurement window of the measurement configuration, determining, based on the ephemeris data for each PCI in the list of PCIs, whether the reference signal would fall within the measurement window. If the reference signal falls within the measurement window, the wireless device 110 measures the reference signal within the measurement window. If the reference signal does not fall within the measurement window, the wireless device 110 refrains from measuring the reference signal within the measurement window.

In a particular embodiment, determining whether to select the measurement window for the one or more satellite cells is further based on a direction of travel of the one or more satellites.

In a particular embodiment, determining whether to select the measurement window for the one or more satellite cells is further based on a speed of the one or more satellites.

In a particular embodiment, the measurement configuration includes a SMTC and the reference signal includes a SSB.

In a particular embodiment, the measurement configuration comprises a PCI.

In a particular embodiment, the wireless device 110 measures the reference signal on the one or more satellite cells during the measurement window.

In a particular embodiment, the wireless device 110 transmits, to a network node 160, a message that includes at least one measurement associated with the reference signal measured during the measurement window.

In a particular embodiment, the wireless device 110 transmits, to the network node 160, a first indication that at least one satellite cell was not measured during the measurement window.

In a particular embodiment, the wireless device 110 transmits, to the network node 160, a second indication that at least one satellite cell was measured during the measurement window and did not meet a minimum threshold.

EXAMPLE EMBODIMENTS

Group A Embodiments

Example Embodiment 1. A method performed by a wireless device, the method comprising: obtaining location and/or ephemeris data for a plurality of satellite cells; receiving a measurement configuration to measure reference signals from one or more satellite cell of the plurality of satellite cells; determining whether to select a measurement window for the one or more satellite cells based on a location of the one or more satellite cells; and measuring a reference signal on one or more selected satellite cells.

Example Embodiment 2. The method of the previous embodiments, wherein determining whether to select a measurement window for the one or more satellite cells is further based on a direction of travel of the one or more satellites.

Example Embodiment 3. The method of the previous embodiments, wherein determining whether to select a measurement window for the one or more satellite cells is further based on a speed of the one or more satellites.

Example Embodiment 4. The method of the previous embodiments, wherein the measurement configuration comprises a SMTC and the reference signal comprises an SSB.

Example Embodiment 5. The method of the previous embodiments, wherein the measurement configuration comprises a PCI.

Example Embodiment 6. A method performed by a wireless device, the method comprising: any of the wireless device steps, features, or functions described above, either alone or in combination with other steps, features, or functions described above.

Example Embodiment 7. The method of the previous embodiments, further comprising one or more additional wireless device steps, features or functions described above.

Example Embodiment 8. The method of any of the previous embodiments, further comprising: providing user data; and forwarding the user data to a host computer via the transmission to the base station.

Group B Embodiments

Example Embodiment 9. A method performed by a base station, the method comprising: any of the base station steps, features, or functions described above, either alone or in combination with other steps, features, or functions described above.

Example Embodiment 10. The method of the previous embodiments, further comprising one or more additional base station steps, features or functions described above.

Example Embodiment 11. The method of any of the previous embodiments, further comprising: obtaining user data; and forwarding the user data to a host computer or a wireless device.

Group C Embodiments

Example Embodiment 12. A wireless device comprising: processing circuitry configured to perform any of the steps of any of the Group A embodiments; and power supply circuitry configured to supply power to the wireless device.

Example Embodiment 13. A base station comprising: processing circuitry configured to perform any of the steps of any of the Group B embodiments; power supply circuitry configured to supply power to the wireless device.

Example Embodiment 14. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 15. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

Example Embodiment 16. The communication system of the pervious embodiment further including the base station.

Example Embodiment 17. The communication system of the previous 2 embodiments, further including the UE, wherein the UE is configured to communicate with the base station.

Example Embodiment 18. The communication system of the previous 3 embodiments, wherein: the processing circuitry of the host computer is configured to execute a host application, thereby providing the user data; and the UE comprises processing circuitry configured to execute a client application associated with the host application.

Example Embodiment 19. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

Example Embodiment 20. The method of the previous embodiment, further comprising, at the base station, transmitting the user data.

Example Embodiment 21. The method of the previous 2 embodiments, wherein the user data is provided at the host computer by executing a host application, the method further comprising, at the UE, executing a client application associated with the host application Example Embodiment 22. A user equipment (UE) configured to communicate with a base station, the UE comprising a radio interface and processing circuitry configured to performs any of the previous 3 embodiments.

Example Embodiment 24. Example Embodiment 23. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

Example Embodiment 25. The communication system of the previous embodiment, wherein the cellular network further includes a base station configured to communicate with the UE.

Example Embodiment 26. The communication system of the previous 2 embodiments, wherein: the processing circuitry of the host computer is configured to execute a host application, thereby providing the user data; and the UE's processing circuitry is configured to execute a client application associated with the host application.

Example Embodiment 27. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

Example Embodiment 28. The method of the previous embodiment, further comprising at the UE, receiving the user data from the base station.

Example Embodiment 29. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

Example Embodiment 30. The communication system of the previous embodiment, further including the UE.

Example Embodiment 31. The communication system of the previous 2 embodiments, further including the base station, wherein the base station comprises a radio interface configured to communicate with the UE and a communication interface configured to forward to the host computer the user data carried by a transmission from the UE to the base station.

Example Embodiment 32. The communication system of the previous 3 embodiments, wherein: the processing circuitry of the host computer is configured to execute a host application; and the UE's processing circuitry is configured to execute a client application associated with the host application, thereby providing the user data.

Example Embodiment 33. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 34. A method implemented in a communication system including a host computer, a base station and a user equipment (UE), the method comprising: at the host computer, receiving user data transmitted to the base station from the UE, wherein the UE performs any of the steps of any of the Group A embodiments.

Example Embodiment 35. The method of the previous embodiment, further comprising, at the UE, providing the user data to the base station.

Example Embodiment 36. The method of the previous 2 embodiments, further comprising: at the UE, executing a client application, thereby providing the user data to be transmitted; and at the host computer, executing a host application associated with the client application.

Example Embodiment 37. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 38. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Example Embodiment 39. The communication system of the previous embodiment further including the base station.

Example Embodiment 40. The communication system of the previous 2 embodiments, further including the UE, wherein the UE is configured to communicate with the base station.

Example Embodiment 41. The communication system of the previous 3 embodiments, wherein: the processing circuitry of the host computer is configured to execute a host application; the UE is configured to execute a client application associated with the host application, thereby providing the user data to be received by the host computer.

Example Embodiment 42. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

Example Embodiment 43. The method of the previous embodiment, further comprising at the base station, receiving the user data from the UE.

Example Embodiment 44. The method of the previous 2 embodiments, further comprising at the base station, initiating a transmission of the received user data to the host computer.

The invention claimed is:

1. A method performed by a wireless device, the method comprising:

obtaining location information associated with the wireless device and/or ephemeris data for one or more satellite cells;

receiving a measurement configuration to measure reference signals from the one or more satellite cells, the measurement configuration comprising at least one measurement window; and determining whether to select or skip a measurement window for the one or more satellite cells based on the location information associated with the wireless device and/or ephemeris data of the one or more satellite cells, wherein determining whether to select the measurement window for the one or more satellite cells comprises:

for each measurement window of the measurement configuration, determining, based on the ephemeris data for each PCI in a list of PCIs, whether a reference signal would fall within the measurement window;

when the reference signal falls within the measurement window, measuring the reference signal within the measurement window; and when the reference signal does not fall within the measurement window, refraining from measuring the reference signal within the measurement window.

2. The method of claim 1, wherein the measurement configuration comprises a list of PCIs and measurement windows.

3. The method of claim 1, wherein determining whether to select the measurement window for the one or more satellite cells is further based on a direction of travel of one or more satellites.

4. The method of claim 1, wherein determining whether to select the measurement window for the one or more satellite cells is further based on a speed of one or more satellites.

5. The method of claim 1, wherein the measurement configuration comprises a Synchronization Signal Block Measurement Time Configuration, SMTC, and a reference signal comprises a Synchronization Signal Block, SSB.

6. The method of claim 1, wherein the measurement configuration comprises a physical cell identity, PCI.

7. The method of claim 1, further comprising measuring a reference signal on the one or more satellite cells during the measurement window.

8. The method of claim 1, further comprising transmitting, to a network node, a message comprising at least one measurement associated with a reference signal measured during the measurement window.

9. The method of claim 1, further comprising transmitting, to a network node, a first indication that at least one satellite cell was not measured during the measurement window.

10. The method of claim 1, further comprising transmitting, to a network node, a second indication that at least one satellite cell was measured during the measurement window and did not meet a minimum threshold.

11. A wireless device comprising a processing circuit adapted to:

obtain location information associated with the wireless device and/or ephemeris data for one or more satellite cells;

receive a measurement configuration to measure reference signals from the one or more satellite cell, the measurement configuration comprising at least one measurement window; and determine whether to select or skip a measurement window for the one or more satellite cells based on the location of the wireless device and/or the ephemeris data for the one or more satellite cells, wherein when determining whether to select the measurement window for the one or more satellite cells the processing circuit is adapted to:

for each measurement window of the measurement configuration, determine, based on the ephemeris data for each PCI in a list of PCIs, whether a reference signal would fall within the measurement window;

when the reference signal falls within the measurement window, measure the reference signal within the measurement window; and when the reference signal does not fall within the measurement window, refrain from measuring the reference signal within the measurement window.

12. The wireless device of claim 11, wherein the measurement configuration comprises a list of PCIs and measurement windows.

13. The wireless device of claim 11, wherein determining whether to select the measurement window for the one or more satellite cells is further based on a direction of travel of one or more satellites.

14. The wireless device of claim 11, wherein determining whether to select a measurement window for the one or more satellite cells is further based on a speed of one or more satellites.

15. The wireless device of claim 11, wherein the measurement configuration comprises a Synchronization Signal Block Measurement Time Configuration, SMTC, and a reference signal comprises a Synchronization Signal Block, SSB.

16. The wireless device of claim 11, wherein the measurement configuration comprises a physical cell identity, PCI.

17. The wireless device of claim 11, wherein the processing circuit is adapted to measure a reference signal on the one or more satellite cells during the measurement window.

18. The wireless device of claim 11, wherein the processing circuit is adapted to transmit, to a network node, a message comprising at least one measurement associated with a reference signal measured during the measurement window.

19. The wireless device of claim 11, wherein the processing circuit is adapted to transmit, to a network node, a first indication that at least one satellite cell was not measured during the measurement window.

20. The wireless device of claim 11, wherein the processing circuit is adapted to transmit, to a network node, a second indication that at least one satellite cell was measured during the measurement window and did not meet a minimum threshold.

* * * * *